United States Patent Office 3,412,951
Patented Nov. 26, 1968

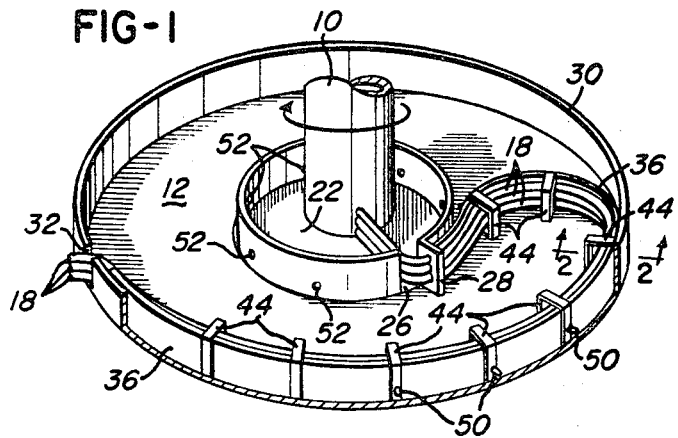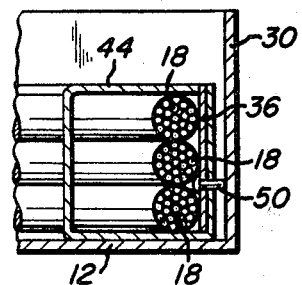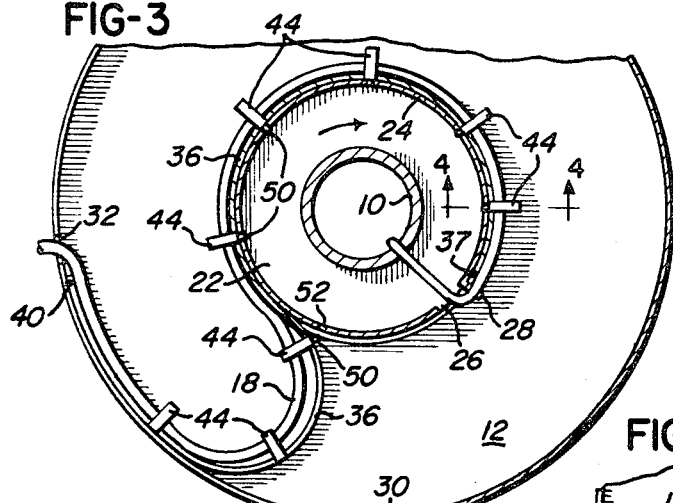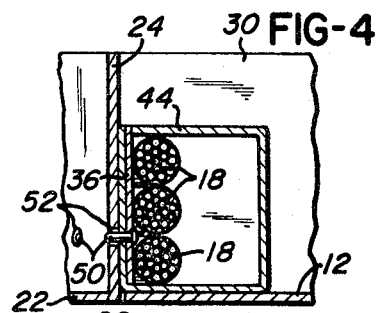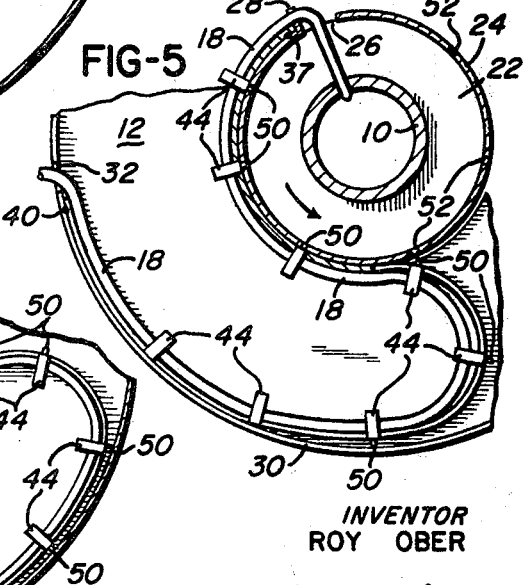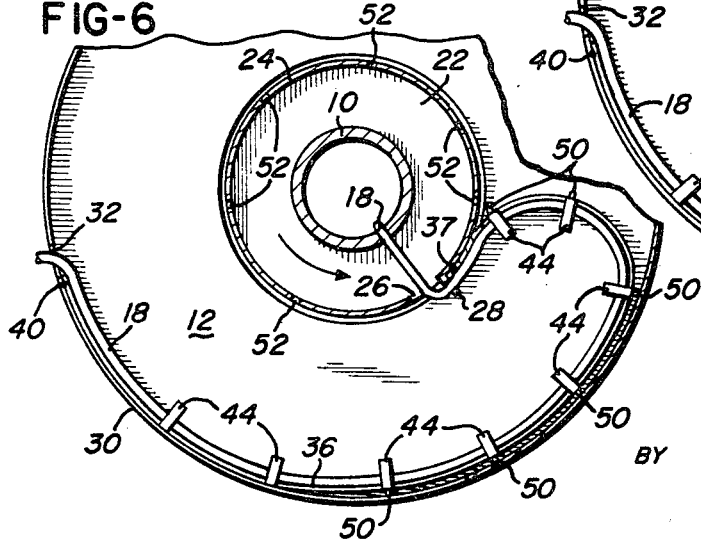

3,412,951
CABLE COILER APPARATUS
Roy Ober, Springfield, Ohio, assignor to Robbins & Myers, Inc., Springfield, Ohio, a corporation of Ohio
Filed Jan. 6, 1967, Ser. No. 607,773
5 Claims. (Cl. 242—54)

ABSTRACT OF THE DISCLOSURE

This invention relates to cable coiler apparatus. The invention relates more particularly to apparatus in which one or more cables or the like extend from stationary structure to rotary structure. This invention provides means for coiling of the cables with rotative movement of the rotary structure in one direction and for uncoiling of the cables with rotative movement of the rotary structure in the opposite direction.

*Background of the invention*

In various types of apparatus one or more cables or the like extend from stationary structure to rotary structure. The cables may be electrical conductor members or the cables may be of other types. The rotary structure is usually one which rotatively moves to a limited extent in both directions of rotative movement. Thus, as the rotary structure rotatively moves, the cable or cables or a portion thereof must move with respect to the stationary structure and with respect to the rotary structure. Preferably, the cable or cables are coiled and uncoiled about the rotary structure with rotative movement thereof.

However, in the past various problems have arisen in regard to cable coiler apparatus. In some types of apparatus the cables are of such a nature that they do not readily coil and uncoil with rotative movement of the rotary structure.

Slip rings or the like have been used to electrically join a rotary member to a stationary member. However, slip ring structure may not be practical in some types of apparatus, such as in apparatus which has a large number of electrical conductor members.

*Summary of the invention*

This invention provides apparatus which joins a cable member or the like to rotary structure and to stationary structure in a manner so that the cable member or the like which extends between the rotary structure and the stationary structure is smoothly coiled or uncoiled with rotative movement of the rotary structure.

*Brief description of the views of the drawing*

FIGURE 1 is a perspective view with parts broken away and shown in section of cable coiler apparatus of this invention.

FIGURE 2 is an enlarged sectional view taken substantially on line 2—2 of FIGURE 1.

FIGURE 3 is a fragmentary top plan view, drawn on substantially the same scale as FIGURE 1, with parts broken away and shown in section of the cable coiler apparatus in another position of operation.

FIGURE 4 is an enlarged sectional view taken substantially on line 4—4 of FIGURE 3.

FIGURE 5 is a fragmentary top plan view, drawn on substantially the same scale as FIGURES 1 and 3, with parts broken away and shown in section, showing the cable coiler apparatus in another position of operation.

FIGURE 6 is a fragmentary top plan view drawn on substantially the same scale as FIGURES 1, 3, and 5 with parts broken away and shown in section, showing the cable coiler apparatus in another position of operation.

*Detailed description of the preferred embodiment*

The cable coiler apparatus of this invention may be a part of any one of several types of apparatus or structure in which cable means or electrical conductor means or the like extends between stationary structure and rotary structure. For example, a stacker crane may comprise rotary structure which includes a mast 10 shown in FIGURES 1, 3, 5, and 6, which is rotatably carried in any suitable manner, not shown. The axis of rotation of the mast 10 is the axis of rotation of the rotary structure. The mast 10 extends through a stationary floor or shelf member 12. Below the floor or shelf member 12, electrical control and/or electrical power means, not shown, is carried by the mast 10 for rotation therewith. The electrical control and/or electrical power means have a plurality of electrical control and/or electrical power conductors or cables 18 which extend therefrom and which are carried by the mast 10 to a position adjacent the floor or shelf 12. Each of the cables 18 may include a plurality of individual conductor members.

A platform 22 is also part of the rotary structure and is secured to the mast 10 for rotative movement therewith. The cables 18 extend along the platform 22 which encompasses the mast 10. Secured to the platform 22 is an arcuate drum or engagement member 24 which is also part of the rotary structure. Preferably, the arcuate drum 24 is formed substantially concentric with the mast 10. The drum or engagement member 24 is shown as having an opening or passageway 26 therethrough through which the cables 18 extend. A lug or bracket 28 is attached to the drum 24 adjacent the opening 26 and is movable with the drum 24 and with respect to the floor 12. The cables 18 extend through the lug 28 for support thereby.

Spaced from the drum 24 and substantially concentric therewith is an arcuate flange 30 which is attached to the floor 12. The flange 30 has an opening or passageway 32 therethrough through which the cables 18 extend to other structure or apparatus.

An elongate flexible support member in the form of a strip 36 has one end portion thereof attached to the rotary structure. Herein the strip 36 is shown as having an end portion thereof attached to the drum 24 adjacent the lug 28. The strip 36 may be said to have a front side surface and a rear side surface. The strip 36 has the rear side surface thereof attached to the drum 24 by a weld 37 or by any other suitable means, as shown in FIGURES 3, 5, and 6. The strip 36 may be of any suitable flexible material such as steel or other metal or the strip may be a plastics material or the like. Preferably, the strip 36 has a degree of resiliency.

A weld 40 or the like at the rear side surface of the strip 36 attaches the other end portion of the strip 36 to the flange 30 adjacent the opening 32.

Attached to the strip 36 along the length thereof is a series of spaced-apart loops or carrier members 44. Each loop or carrier member 44 is attached to the strip 36 in any suitable manner. Herein each of the loops or carrier members 44 encompasses the strip 36 and is secured thereto by any suitable means. Each loop 44 extends from the front side surface of the strip 36. The cables 18 loosely extend through the loops 44 and are laterally movable with respect thereto. Thus, the loops 44 loosely attach the cables 18 to the strip 36 as the loops 44 limit the movement of the cables 18 with respect to the strip 36. Preferably, when more than one cable 18 is involved in apparatus of this invention, the cables 18 are arranged in superposed relationship as best shown in FIGURES 2 and 4.

A plurality of stems 50 is arranged in seriatim relationship to extend laterally from the rear side surface of the strip 36. Herein, each of the loops 44 which is within a given distance from the lug 28 has a stem 50 secured thereto.

The drum 24 has a series of spaced-apart holes 52 therein. The spacing between the holes 52 is equal to the spacing between the stems 50.

*Operation*

The type of structure with which apparatus of this invention is associated is ordinarily of the type in which the rotary structure rotates through only a limited degree of movement in each direction of rotative movement. The apparatus, as shown, is capable of rotative movement throughout a range of about 360 degrees. However, apparatus made according to this invention may have a range of rotative movement which is greater or less than 360 degrees.

FIGURE 1 shows the rotary structure, including the mast 10, in clockwise movement. Of course, the platform 22 and the drum 24, which are also parts of the rotary structure rotatively move with rotative movement of the mast 10. As the mast 10 rotatively moves from the position thereof shown in FIGURE 1 to the position thereof shown in FIGURE 3, successive portions of the strip 36 are gradually drawn into engagement with the drum 24. Thus, portions of the strip 36 are wound or wrapped upon the drum 24. As successive portions of the strip 36 are drawn into engagement with the drum 24, successive loops 44 are moved into juxtaposition with the drum 24.

As each loop 44 comes into juxtaposition with the drum 24 the stem 50 thereof enters one of the openings 52 in the drum 24, as shown in FIGURE 3. FIGURE 3 shows the mast 10 rotatively moved to a position approaching its maximum position in the clockwise direction of rotative movement.

If the mast 10 rotatively moves to a greater extent in a clockwise direction from that shown in FIGURE 3, a succeeding portion of the strip 36 is drawn into engagement with the drum 24 and another stem 50 moves into a hole 52 which is provided therefor in the drum 24.

It is to be noted that as the strip 36 and the loops 44 are moved toward the drum 24 by clockwise rotation of the mast 10, the loops 44 draw the cables 18 toward the drum 24. Thus, as successive portions of the strip 36 are drawn into engagement with the drum 24, successive portions of the cables 18 are drawn toward the drum 24 by the loops 44 which are carried by the strip 36. However, due to the fact that the cables 18 are laterally movable within the loops 44, portions of the cables 18 are free to smoothly position themselves with respect to the drum 24 and within the confines of the loops 44. Thus, as successive portions of the cables 18 are drawn by the loops 44 toward the drum 24, the cables 18 do not need to bend to the same degree as the strip 36 bends. Thus, the severity of bending of the cables 18 is limited. Therefore, coiling action of the cables 18 with rotative movement of the mast 10 is free and smooth and is performed with a minimum amount of force.

As the rotary structure, including the mast 10 and the drum 24, is rotatively moved in a counterclockwise direction as illustrated in FIGURE 5, longitudinal pressure is applied to the strip 36 from the end thereof which is attached by the weld 37 to the drum 24. Thus, counterclockwise movement of the drum 24 tends to force portions of the strip 36 which are in engagement with the drum 24 out of engagement therewith. If all portions of the strip 36 should simultaneously move out of engagement with the drum 24, unwind movement of the strip 36 and the cables 18 from the drum 24 could not occur smoothly. However, as illustrated in FIGURE 5, each of the stems 50 which is disposed within the drum 24 remains for a given period in interlocked relationship with the drum 24 during counterclockwise movement of the drum 24. Therefore, each stem 50 maintains its respective portion of the strip 36 in engagement with the drum 24 during counterclockwise movement thereof until that portion of the strip 36 becomes somewhat tangential with respect to the drum 24. Each of the stems 50, therefore, moves from the drum 24 in proper sequence. Thus, the strip 36 is smoothly unwound from the drum 24 and gradually moves in a direction therefrom. Therefore, the cables 18 are smoothly uncoiled from the drum 24.

As discussed above, when the mast 10 and the drum 24 rotatively move clockwise, the cables 18 and the strip 36 are wound upon the drum 24. As such winding upon the drum 24 occurs as shown in FIGURE 3, the cables 18 are positioned farther from the center of the drum 24 than is the strip 36. Thus, the portion of the cable 18 which is wrapped upon the drum 24 is slightly longer than the portion of the strip 36 which is wrapped upon the drum 24. Therefore, as such winding upon the drum occurs, there is relative longitudinal movement between the cables 18 and the strip 36. Thus, as shown in FIGURE 3, an arcuate portion of the cables 18 becomes spaced from an arcuate portion of the strip 36 at a location intermediate the drum 24 and the opening 32. As the space is created between the strip 36 and the cables 18 there is lateral movement between the strip 36 and the cables 18.

When the drum 24 and the mast 10 are rotatively moved counterclockwise to a position such as shown in FIGURE 6, an arcuate formation of the strip 36 and the cables 18 occurs adjacent the drum 24. The portion of the cables 18 and the portion of the strip 36 which form the arcuate formation in FIGURE 6 are the same portions thereof which are shown wound upon the drum 24 in FIGURE 3. However, in the arcuate formation shown in FIGURE 6, the strip 36 is farther from the center of the arc than the cables 18. Thus, the portion of the cables 18 within the arc shown in FIGURE 6 occupies a relatively shorter arc length than the portion of the strip 36 within the arc shown in FIGURE 6. Thus, the portion of the cables 18 which forms the arc in FIGURE 6 is in firm engagement with the portion of the strip 36 which forms the arc in FIGURE 6. Therefore, during rotative movement of the drum 24 from the position thereof shown in FIGURE 3 to the position thereof shown in FIGURE 6 there is relative longitudinal movement between the cables 18 and the strip 36.

Thus, it is to be understood that the loose attachment of the cables 18 to the strip 36 permits smooth relative longitudinal and lateral movement between portions of the cables 18 and the strip 36 as successive portions of the strip 36 and the cables 18 move into and out of arcuate formation.

The flange 30 serves to limit the movement of intermediate portions of the cables 18 in a direction from the drum 24. Thus, as counterclockwise movement of the rotary structure continues, successive portions of the strip 36 come into engagement with the flange 30. Also, the loops 44 and the stems 50 carried by the strip 36 come into engagement with the flange 30, as shown in FIGURE 6. Thus, of course, portions of the cables 18 are moved into juxtaposition with the flange 30. FIGURE 6 illustrates counterclockwise rotative movement of the rotary structure as the rotary structure approaches its extreme counterclockwise position.

Thus, with rotative movement of the mast 10 and the drum 24 the cables 18 are smoothly wound upon the drum 24 or are smoothly unwound therefrom. Thus, the apparatus of this invention provides means by which cable members 18 or the like which extend between two relatively rotatable members are smoothly controlled during relative rotative movement of the members.

Although the preferred embodiment of the invention has been described, it will be understood that within the purview of this invention various changes may be made in the form, details, proportion and arrangement of parts, or the combination thereof to provide a structure The invention having thus been described, the following is claimed:

1. Apparatus of the type described comprising:
   first support structure,
   second support structure,
   the first support structure and the second support structure being relatively rotatable about a given axis,
   an elongate flexible support member attached to the first support structure and to the second support structure,
   a plurality of spaced-apart guide members attached in seriatim relationship to the elongate flexible support member,
   cable means carried by the first support structure and by the second support structure, the cable means extending freely through each of the guide members,
   a plurality of stems carried by the guide members and extending from the elongate flexible support member,
   the first support structure including arcuate engagement means, the arcuate engagement means being coaxial with the axis of relative rotation of the first support structure and the second support structure, the arcuate engagement means having a plurality of openings therein, there being one opening for each stem of the guide members,
   the elongate flexible support member being drawn into engagement with the arcuate engagement means as relative rotative movement in one direction occurs between the first support structure and the second support structure, the guide members also being moved into juxtaposition with the engagement means during such relative rotative movement of the support structures in one direction, the stems entering the openings in the engagement means as the guide members are moved into juxtaposition with the engagement means, the guide members causing the cable means to be drawn into adjacent relationship with the engagement means as the guide members move into juxtaposition with the engagement means, the elongate flexible support member being urged to move in a direction from the engagement means as relative rotative movement of the support structures occurs in the opposite direction, the stems moving from the engagement means in sequential relationship as said relative rotative movement of the support structures occurs in the opposite direction so that the guide members and portions of the elongate flexible support member and portions of the cable means are also moved sequentially in a direction from the engagement means.

2. Apparatus of the type described comprising:
   first support structure,
   second support structure,
   the first support structure and the second support structure being relatively rotatable about a given axis,
   cable means extending between the first support structure and the second support structure,
   elongate flexible support means having an end portion attached to the first support structure and an end portion attached to the second support structure, the support means including means supporting the cable means along the length thereof,
   engagement means carried by the first support structure,
   interlocking means carried by the engagement means and by the flexible support means for removably interlocking successive portions of the elongate flexible support means with the engagement means,
   successive portions of the elongate flexible support means being moved into juxtaposition with the engagement means as relative rotative movement in one direction occurs between the first support structure and the second support structure, such movement of successive portions of the elongate flexible support means being movement which is relative to the support structures, the interlocking means operating to interlock the successive portions of the elongate flexible support means with the engagement means as said successive portions of the elongate flexible support means move into juxtaposition with the engagement means,
   successive portions of the cable means also being moved toward the engagement means as successive portions of the support means are moved toward the engagement means, portions of the elongate flexible support means being urged to move in a direction from the engagement means as relative rotative movement of the support structures occurs in the opposite direction, the interlocking means retaining the portions of elongate flexible support means in juxtaposition with the engagement means until the successive portions of the elongate flexible support means are moved into a given relationship with resepct to the support structures during such relative rotative movement of the support structures in said opposite direction of rotative movement.

3. In apparatus provided with rotary structure and stationary structure, a cable carried by the stationary structure and by the rotary structure, the rotary structure including a drum, the drum being formed about an axis which is coaxial with the axis of rotation of the rotary structure,
   elongate flexible support means extending from the rotary structure to the stationary structure, the elongate flexible support means having an end portion attached to the rotary structure and an end portion attached to the stationary structure,
   connection means connecting the cable to the elongate flexible support means along the length thereof,
   rotative movement of the rotary structure in one direction causing the elongate flexible support means to be moved into juxtaposition with the drum so that the cable is moved toward the drum, rotative movement of the rotary structure in the opposite direction causing the elongate flexible support means to be forced in a direction from the drum so that the cable is moved in a direction from the drum, the drum being provided with a series of holes therein, there being a series of stems extending from the elongate flexible support means, each of the stems being movable into one of the holes in the drum as the elongate flexible support means is drawn into juxtaposition with the drum with rotative movement of the rotary structure.

4. The apparatus of claim 3 in which each of the stems is secured to the connection means.

5. Apparatus of the type described comprising:
   a rotary mast,
   support means attached to the mast for rotation therewith,
   an annular drum attached to the support means for rotation therewith, the annular drum being substantially coaxial with the axis of rotation of the mast,
   a stationary floor encompassing the annular drum,
   an arcuate flange attached to the floor, the arcuate flange being formed about an axis which is coaxial with the axis of rotation of the mast, the flange being spaced from the drum,
   a cable attached to the mast and extending therefrom to the flange,
   an elongate flexible support strip attached to the drum and to the flange and extending therebetween,
   carrier means attached to the elongate strip along the length thereof, the carrier means being in supporting relationship to portions of the cable which are disposed between the drum and the arcuate flange, the carrier means including a series of loop members which are in spaced-apart relationship along the length of the elongate flexible strip, a plurality of stem members, there being a stem member carried by each one of several of the loop members, the drum having a plurality of openings therein, there being one opening in the drum for each of the stem members, each stem member being movable into one of the openings as the elongate flexible strip is moved into engagement with the drum with rotation of the drum, the cable being moved toward the drum as the strip is moved toward the drum and as the loop members move the cable toward the drum.

References Cited

UNITED STATES PATENTS

| | | | |
|---|---|---|---|
| 1,782,191 | 11/1930 | Bolling | 191—12 X |
| 1,868,409 | 7/1932 | Grispen | 242—107.1 |
| 2,219,201 | 10/1940 | Smith. | |
| 3,106,368 | 10/1963 | Tait et al. | 242—107.1 |

FOREIGN PATENTS

| | | |
|---|---|---|
| 703,931 | 2/1931 | France. |

WILLIAM S. BURDEN, *Primary Examiner.*